United States Patent [19]
Kitta et al.

[11] Patent Number: 5,860,026
[45] Date of Patent: Jan. 12, 1999

[54] INFORMATION PROCESSING SYSTEM FOR CONTROLLING OPERATIONS OF INPUT/OUTPUT DEVICES OF ANOTHER CLUSTERS ACCORDING TO CONTROL INSTRUCTIONS ISSUED FROM A CLUSTER

[75] Inventors: Michio Kitta, Yamanashi; Akira Jippo, Tokyo, both of Japan

[73] Assignee: NEC Corporation, Tokyo, Japan

[21] Appl. No.: 646,547

[22] Filed: May 8, 1996

[30] Foreign Application Priority Data

May 8, 1995 [JP] Japan .................................. 7-109422

[51] Int. Cl.$^6$ ........................................ A06F 13/10
[52] U.S. Cl. ......................... 395/853; 395/825; 395/840
[58] Field of Search ........................... 395/200.63, 853, 395/825, 840; 711/173, 113, 170, 4, 114

[56] References Cited

U.S. PATENT DOCUMENTS

| | | | |
|---|---|---|---|
| 4,476,526 | 10/1984 | Dodd | 711/113 |
| 4,607,346 | 8/1986 | Hill | 711/170 |
| 4,780,808 | 10/1988 | Moreno et al. | 711/4 |
| 5,133,060 | 7/1992 | Weber et al. | 711/113 |
| 5,212,773 | 5/1993 | Hillis | 395/200.73 |
| 5,289,470 | 2/1994 | Chang et al. | 711/173 |
| 5,301,351 | 4/1994 | Jippo | 395/200.63 |
| 5,606,684 | 2/1997 | Nakano et al. | 711/114 |

*Primary Examiner*—Le Hien Luu
*Attorney, Agent, or Firm*—Foley & Lardner

[57] ABSTRACT

In an information processing system including a first cluster which issues a control instruction for controlling an input/output device of another cluster and a second cluster which executes processing by the input/output device according to the control instruction, which are connected through a network interconnecting clusters, a processor mounted on the first cluster comprises a cluster discrimination unit for discriminating a cluster which executes the control instruction and an instruction transfer unit for transferring the control instruction to the corresponding second cluster depending on the judgment of the cluster discrimination unit, while a data transfer processing device mounted on the second cluster comprises a transfer buffer for temporarily storing the data to be transferred to another cluster, a transfer buffer control unit for controlling reading and writing of the data from and into the transfer data storage unit, and a transfer control unit for controlling the transfer buffer control unit according to the control instruction from the first cluster.

10 Claims, 11 Drawing Sheets

INFORMATION PROCESSING SYSTEM FOR CONTROLLING OPERATIONS OF INPUT/ OUTPUT DEVICES OF ANOTHER CLUSTERS ACCORDING TO CONTROL INSTRUCTIONS ISSUED FROM A CLUSTER

BACKGROUNDS OF THE INVENTION

1. Field of the Invention

The present invention relates to an information processing system having a plurality of clusters connected through a network interconnecting clusters, and more particularly to an information processing system for controlling operations of an input/output device of another cluster according to instructions of a cluster.

2. Description of the Related Art

In this kind of a conventional information processing system connecting a plurality of clusters through a network interconnecting clusters, in the case of operating an input/output device in a predetermined cluster by instructions of a cluster other than the predetermined cluster, the input/output device is controlled by the use of a processor mounted on the predetermined cluster having the input/output device.

FIG. 11 is a block diagram showing an organization of a cluster in the conventional information processing system. FIG. 10 is a block diagram showing an organization of a processor mounted on each cluster in the conventional information processing system. FIG. 9 is a block diagram showing a data transfer processing device mounted on each cluster in the conventional information processing system.

As illustrated in FIG. 11, a cluster 30 of the conventional information processing system comprises a plurality of processors 31 for conducting various processing, a shared memory 13 for being shared among the processors 31, a local network 12 for connecting the processors 31 and the shared memory 13, and a data transfer processing device 35 connected with the local network 12 for controlling input/output devices 14 and data transfer between another cluster and this one via a network 40 interconnecting clusters.

As illustrated in FIG. 10, the processor 31 of the conventional information processing system comprises a cluster discrimination unit 311, a processor selection unit 312 and an instruction transfer unit 313 for transferring input/output instructions toward input/output devices of another cluster, and a request control unit 315, a request decoding unit 316, a request storage unit 317, an input/output instruction issuing unit 318, a buffer transfer unit 319 and a request termination notifying unit 320 for processing input/output instructions issued by a processor of another cluster. It further comprises an interface port 314 for connecting with a local network 12 as well as the other components for issuing and processing the input/output instructions toward the input/output devices of the present cluster, which are not shown.

As illustrated in FIG. 9, the data transfer processing device 35 of the conventional information processing system comprises an instruction storage unit 351, an instruction decoding unit 352, a transfer control unit 354 and a data transfer unit 356 for controlling data transfer between another cluster and this one, and an instruction completion notifying unit 355 for notifying completion of the input/output processing according to the input/output instruction from the processor 31 and a shared memory access unit 353 for accessing the shared memory 13. It further comprises a local network port 359 for connecting with the local network 12 and a network port 360 interconnecting clusters for connecting with the network 40 interconnecting clusters.

An operation in thus-constituted conventional information processing system will be explained in the case where an input/output instruction issued by a processor 31 of a predetermined clusters 30 is to direct an input/output device belonging to another cluster 30 than the predetermined cluster to perform the input/output of the data.

In a cluster 30 which issues the input/output instruction, the processor 31 judges whether the input/output instruction is directed to an input/output device 14 of the present cluster 30, or it is directed to an input/output device 14 of another cluster 30 by the use of the cluster discrimination unit 311. When the input/output instruction is directed to the input/output device 14 belonging to another cluster 30, the processor selection unit 312 selects a processor 31 among a plurality of processors 31 in another cluster 30 indicated by the cluster identifier designated by the input/output instruction, or a cluster 30 designated for processing the input/output instruction. The instruction transfer unit 313 transfers the input/output instruction as a request intervening processors to the local network 12 with the selected processor 31 of another cluster 30 fixed as a destination.

The processors intervening request transferred to the local network 12 is further transferred to the network 40 interconnecting clusters via the data transfer processing device 35. It is supplied to the destination cluster 30, where it is supplied to the processor 31 selected as the destination through the data transfer processing device 35 and the local network 12 of the destination cluster 30.

In the cluster 30 having received the processors intervening request, the processor 31 which has been selected as the destination stores the processors intervening request into the request storage unit 317 on receipt of the processors intervening request, at first. The request decoding unit 316 reads out the processors intervening request stored in the request storage unit 317 and decodes it. Processing shall be conducted according to the decoded request. For example, when the request is to direct reading of the data from the input/output device 14, the input/output instruction issuing unit 318 alters the input/output instruction in the request, and issues the input/output instruction to the data transfer processing device 35 of the present cluster 30 with the buffer on the shared memory 13 of the present cluster 30 used as the buffer for data transfer from the input/output device 14, the present cluster being designated by the input/output instruction.

The data transfer processing device 35 executes an ordinal input/output processing on the basis of the input/output instruction. More specifically, when the instruction storage unit 351 receives the input/output instruction issued by the input/output instruction issuing unit 318, the instruction decoding unit 352 reads out the input/output instruction from the instruction storage unit 351 and decodes it. The transfer control unit 354 receives control information such as the number of an input/output device, an input data address, a length of input data, a writing starting address in the shared memory and the like, which have been read out from the input/output instruction by the instruction decoding unit 352, and gives an instruction of the data input/output to the data transfer unit 356. In the instruction for executing data input with an input/output device 14 as mentioned above, the data input is executed with a specified input/output device 14. The data transfer unit 356 reads out a desired data by the use of the input/output device 14 according to the instruction, sends it to the shared memory access unit 353, and notifies the transfer control unit 354 of the reading completion. The transfer control unit 354 gives an instruction to the shared memory access unit 353 so as to write the data which is sent from the data transfer unit 356 to the shared memory access unit 353, into the shared memory 13. According to the instruction, the shared memory access unit 353 writes the data into the shared memory 13 and notifies the transfer control unit 354 of the writing completion. The transfer control unit 354 reports the completion notice received from the shared memory access unit 353, together with the processor number of the processor 31 (request source processor) of the cluster 30 having issued the instruction, to the instruction completion notifying unit 355. The instruction completion notifying unit 355 reports execution completion of the input/output instruction to the request source processor 31.

On receipt of the completion notice from the instruction completion notifying unit 355 of the data transfer processing device 35, the processor 31 issues to the data transfer processing device 35, the transfer instruction for transferring the data from the input buffer on the shared memory 13 of this cluster 30 to the input buffer on the shared memory 13 of the cluster 30 having issued the processors intervening request.

The data transfer processing device 35 performs an ordinal data transfer processing according to the received data transfer instruction. Specifically, when the instruction storage unit 351 receives the data transfer instruction from the processor 31, the instruction decoding unit 352 reads out the transfer instruction from the instruction storage unit 351 and decodes it. The transfer control unit 354 receives the information such as a reading starting address on the shared memory 13 of the present cluster 30, which has been read out from the data transfer instruction by the instruction decoding unit 352, a transfer length, a writing starting address in the shared memory 13 of the data destination cluster 30 and the like, and gives an instruction to the shared memory access unit 353 so as to read out the data from the shared memory in units of every data transfer processing. The shared memory access unit 353 transfers the read out data to the data transfer unit 356 and notifies the transfer control unit 354 of the reading completion. The transfer control unit 354 gives an instruction to the data transfer unit 356 so as to transmit to the network 40 interconnecting clusters, the data sent from the shared memory access unit 353 to the data transfer unit 356. At this time, a cluster identifier, a writing address in another cluster, a transfer length, operational instructions to the data transfer processing device of another cluster and the like are added to the transfer data. According to these instructions, the data transfer unit 356 transmits the transfer data to the network 40 interconnecting clusters, where the transfer data is transferred to the cluster specified as the destination by the cluster identifier which has been added to the data.

The data transfer processing device 35 of the destination cluster 30 separates the additional control information from the data received by the data transfer unit 356 and moves it to the transfer control unit 354. The transfer control unit 354 gives an instruction to the data transfer unit 356 and the shared memory access unit 353 so as to write the data within the data transfer unit 356 into the shared memory 13 according to the additional control information. The data transfer unit 356 reads out the written data and sends it to the shared memory access unit 353 according to the instruction. The shared memory access unit 353 writes the written data received from the data transfer unit 356 into the predetermined address on the shared memory 13 and notifies the transfer control unit 354 of the writing completion. The transfer control unit 354 transfers to the instruction completion notifying unit 355, the received completion notice as well as the cluster number of the cluster 30 which issues the data transfer instruction, or the cluster 30 which executes the input/output processing, the cluster number being read out from the control information. The instruction completion notifying unit 355 notifies the data transfer unit 356 of the data transfer processing device 35 of the cluster 30 which issues the instruction that the transfer has been completed.

When the data transfer processing device 35 of the instruction issuing cluster 30 receives the completion notice, the transfer control unit 354 transfers the completion notice as well as the number of the request source processor to the instruction completion notifying unit 355, and the instruction completion notifying unit 355 notifies the processor 31 which has issued the data transfer instruction of the completion.

On receipt of the notice, the processor 31 having issued the data transfer notifies the processor 31 of the cluster 30 having issued the processors intervening request that the whole process has been completed with respect to the corresponding request.

As mentioned above, when an instruction for controlling an input/output device belonging to another cluster is issued from a processor mounted on a determined cluster in this kind of the conventional information processing system, processing has been performed in the following order; an instruction is transferred between clusters, input/output devices are operated by the control of the cluster in which the instruction has been received, the processing result by the input/output devices of the clusters is delivered therebetween, and completion of receiving the processing result in the clusters is notified therebetween. The processing of the input/output device of the cluster having received the instruction has been executed according to the control of the processor of the same cluster in the same way as in the case where the processor of the above cluster issues the instruction.

More specifically, when input/output control of the data is performed on the input/output device belonging to a cluster other than a predetermined cluster by a processor mounted on the predetermined cluster, the input/output operation has been performed by the use of the processor belonging to the cluster other than the predetermined cluster, the cluster including the input/output device to be controlled in the above mentioned conventional information processing device. Therefore, it has a defect that the procedure for executing the control becomes complicated, thereby to deteriorate the efficiency.

Also, it has a defect that execution performance of the application program in the cluster including the input/output device is degraded because the processor is used for the control of the input/output device of the above cluster.

Therefore, in the case where one of clusters is regarded as a front end cluster and the others are regarded as back end clusters, it is difficult to concentrically control the input/output devices of the respective clusters by the front end cluster.

SUMMARY OF THE INVENTION

A first object of the present invention is to provide an information processing system capable of directly controlling an input/output device belonging to another cluster, without using a processor of another cluster on which the input/output device is mounted, in case of performing input/output control of the data for the input/output device of another cluster by the processor mounted on a determined cluster.

According to a second object of the present invention, a processor is not used in another cluster at the time of controlling the input/output device of another cluster, thereby preventing the deterioration in the execution performance of application programs in another cluster, in addition to the above first object.

According to a third object of the present invention, it is possible to save the memory of the shared memory of another cluster in case of controlling an input/output device mounted on another cluster, thereby reducing the load of another cluster including the input/output device, in addition to the above second object.

A fourth object of the present invention is to provide an information processing system capable of reducing the load of a back end cluster and preventing the deterioration in the overall performance of the system, in the case where one of clusters is regarded as the front end cluster and others are regarded as back end clusters and input/output devices of the respective clusters are concentrically controlled by the front end cluster.

According to the first aspect of the invention, an information processing system including a plurality of clusters connected through a network interconnecting clusters, each of said clusters comprising a plurality of processors for performing various processing, a shared memory for being shared among the processors, a local network connecting the processors and shared memory, and a data transfer processing device, which is connected with the local network, for controlling input/output devices and data transfer between another cluster and this one via the network interconnecting clusters, comprising:

a first cluster which issues a control instruction for controlling said input/output device of another cluster and a second cluster which executes processing by said input/output device according to the control instruction, wherein said processor mounted on said first cluster comprising:
    a cluster discrimination means for discriminating a cluster which executes a control instruction when the control instruction is issued;
    an instruction transfer means for transferring the control instruction to said corresponding second cluster according to the judgment of said cluster discrimination means;

said data transfer processing device mounted on said second cluster comprising:
    a data transfer means for executing data transfer between said network interconnecting clusters and the input/output device;
    a transfer data storage means for temporally storing the data to be transferred to another cluster;
    a transfer data reading and writing control means for controlling reading and writing of the data from and into said transfer data storage means;
    a transfer control means for controlling said data transfer means, said transfer data reading and writing control means; and
    a completion notifying means for detecting completion of the transfer and notifying the data destination of the transfer completion.

In the preferred construction, when said transfer control means and said data transfer means execute the data input by means of the input/output device according to the control instruction issued from said first cluster, said transfer data reading and writing control means carries out reading and writing of the input data from and into said transfer data storage means according to the control of said transfer control means.

In the preferred construction, the cluster discrimination means of said first cluster judges whether the control instruction issued by said processor is directed to an input/output device of the same cluster, or it is directed to an input/output device of another cluster, and the instruction transfer means of said first cluster performs transfer control for transferring the input/output instruction to said corresponding second cluster when the control instruction is an input/output instruction toward the input/output device of another cluster, and when said transfer control means and said data transfer means execute the data input by means of the input/output device according to the control instruction issued from said first cluster, said transfer data reading and writing control means of said second cluster carries out reading and writing of the input data from and into said transfer data storage means according to the control of said transfer control means.

In another preferred construction, all the clusters constituting said information processing system serve as both parts of said first cluster and said second cluster.

According to the second aspect of the invention, an information processing system including a plurality of clusters connected through a network interconnecting clusters, each of said clusters comprising a plurality of processors for performing various processing, a shared memory for being shared among the processors, a local network connecting the processors and shared memory, and a data transfer processing device, which is connected with the local network, for controlling input/output devices and data transfer between another cluster and this one via the network interconnecting clusters, comprising:

a first cluster which issues a control instruction for controlling said input/output device of another cluster and a second cluster which executes processing by said input/output device according to the control instruction, wherein said processor mounted on said first cluster comprising:
    a cluster discrimination means for discriminating a cluster which executes a control instruction when the control instruction is issued;
    a composite instruction creating means for creating a transfer instruction for transferring the processing result by the control instruction from said second cluster to said first cluster, so as to add the transfer instruction to the control instruction, depending on the judgment of said cluster discrimination means;
    an instruction transfer means for transferring the control instruction to said corresponding second cluster according to the judgment of said cluster discrimination means;

said data transfer processing device mounted on said second cluster comprising:
    a data transfer means for executing data transfer between said network interconnecting clusters and the input/output device;
    a transfer control means for controlling said data transfer means, said transfer data reading and writing control means, and
    a completion notifying means for detecting completion of the transfer and notifying the data destination of the transfer completion.

In the preferred construction, the composite instruction creating means creates instructions for shifting the transferring parameter specified by the control instruction from the shared memory of said first cluster to a buffer on the shared memory of said corresponding second cluster as well as instructions for transferring the data entered by the input/ output device of said second cluster to a buffer on the shared memory of said first cluster, so as to add these instructions to the control instruction.

According to the third aspect of the invention, a cluster including a plurality of processors for performing various processing, a shared memory for being shared among the processors, a local network connecting the processors and the shared memory, and a data transfer processing device, which is connected with the local network, for controlling input/output devices and data transfer between another cluster and this one via a network interconnecting clusters, said cluster being connected to another cluster via the network interconnecting clusters, in which said processor comprising:
  a cluster discrimination means for discriminating a cluster which executes the control instruction when the control instruction is issued;
  an instruction transfer means for transferring the control instruction to another corresponding cluster according to the judgment of said cluster discrimination means; and said data transfer processing device comprising:
  a data transfer means for executing data transfer between said network interconnecting clusters and the input/output device;
  a transfer data storage means for temporally storing the data to be transferred to another cluster;
  a transfer data reading and writing control means for controlling reading and writing of the data from and into said transfer data storage means;
  a transfer control means for controlling said data transfer means and said transfer data reading and writing control means; and
  a completion notifying means for detecting completion of the transfer and notifying the data destination of the transfer completion.

In the preferred construction, the cluster discrimination means discriminates whether the control instruction issued by said processor is directed toward an input/output device of the same cluster or it is directed toward an input/output device of another cluster, and the instruction transfer means performs transfer control for transferring the input/output instruction to another cluster when the control instruction is an input/output instruction toward the input/output device of another cluster, and when said transfer control means and said data transfer means execute the data input by means of the input/output device according to the control instruction issued from another cluster, said transfer data reading and writing control means carries out reading and writing of the input data from and into said transfer data storage means according to the control of said transfer control means.

According to another aspect of the invention, a cluster including a plurality of processors for performing various processing, a shared memory for being shared among the processors, a local network connecting the processors and the shared memory, and a data transfer processing device, which is connected with the local network, for controlling input/output devices and data transfer between another cluster and this one via a network interconnecting clusters, said cluster being connected to another cluster via the network interconnecting clusters, in which said processor comprising:
  a cluster discrimination means for discriminating a cluster which executes the control instruction when the control instruction is issued;
  a composite instruction creating means for creating a transfer instruction for transferring the processing result by the control instruction from said second cluster to said first cluster, so as to add the transfer instruction to the control instruction, depending on the judgment of said cluster discrimination means;
  an instruction transfer means for transferring the control instruction to another corresponding cluster according to the judgment of said cluster discrimination means; and said data transfer processing device comprising:
  a data transfer means for executing data transfer between said network interconnecting clusters and the input/output device;
  a transfer data storage means for temporally storing the data to be transferred to another cluster;
  a transfer data reading and writing control means for controlling reading and writing of the data from and into said transfer data storage means;
  a transfer control means for controlling said data transfer means and said transfer data reading and writing control means; and
  a completion notifying means for detecting completion of the transfer and notifying the data destination of the transfer completion.

In the preferred construction, the composite instruction creating means creates instructions for shifting the transferring parameter specified by the control instruction from the shared memory of the same cluster to a buffer on the shared memory of another cluster as well as instructions for transferring the data entered by the input/output device of another cluster to a buffer on the shared memory of the same cluster, so as to add these instructions to the control instruction, on the basis of the discrimination result of said cluster discrimination means.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

A preferred embodiment of the present invention will be described in detail with reference to the accompanying drawings.

Figure 3:
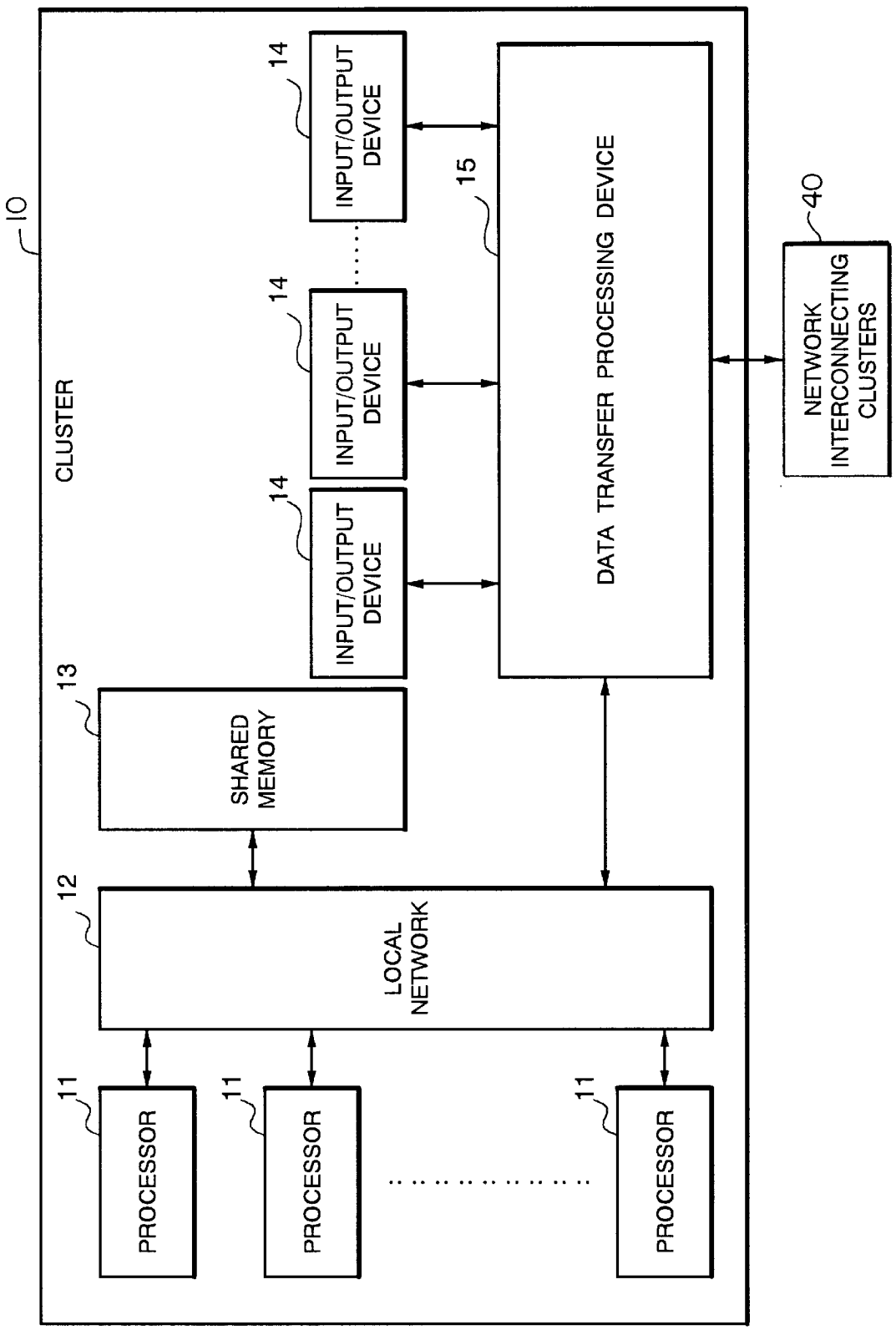
FIG. 3 is a block diagram showing an organization of the cluster according to the first embodiment.
Figure 4:
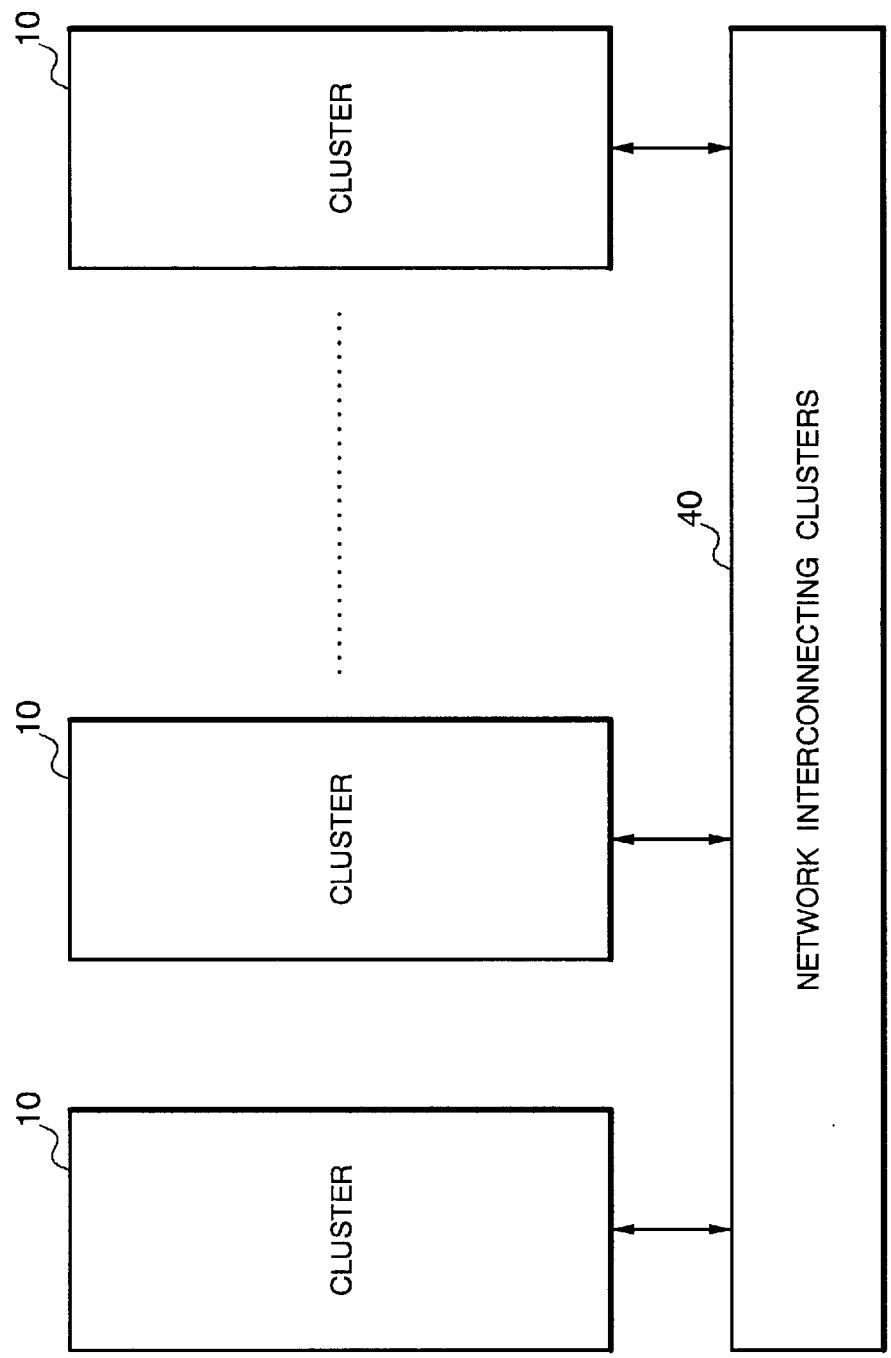
FIG. 4 is a block diagram showing an organization of the information processing system according to the first embodiment.

FIG. 4 is a block diagram showing an organization of an information processing system according to a first embodiment of the present invention. FIG. 3 is a block diagram showing an organization of a cluster according to the first embodiment.

As illustrated in FIG. 4, the information processing system of the present invention consists of a plurality of clusters 10 connected through a network 40 interconnecting clusters. Every cluster 10 has the same organization as shown in FIG. 3.

As illustrated in FIG. 3, the cluster 10 of the present embodiment comprises a plurality of processors 11 for conducting various processing, a shared memory 13 for being shared among the processors 11, a local network 12 for connecting the processors 11 and the shared memory 13, and a data transfer processing device 15 connected with the local network 12 for controlling input/output devices 14 and data transfer between another cluster and this one via the network 40 interconnecting clusters.

Figure 2:
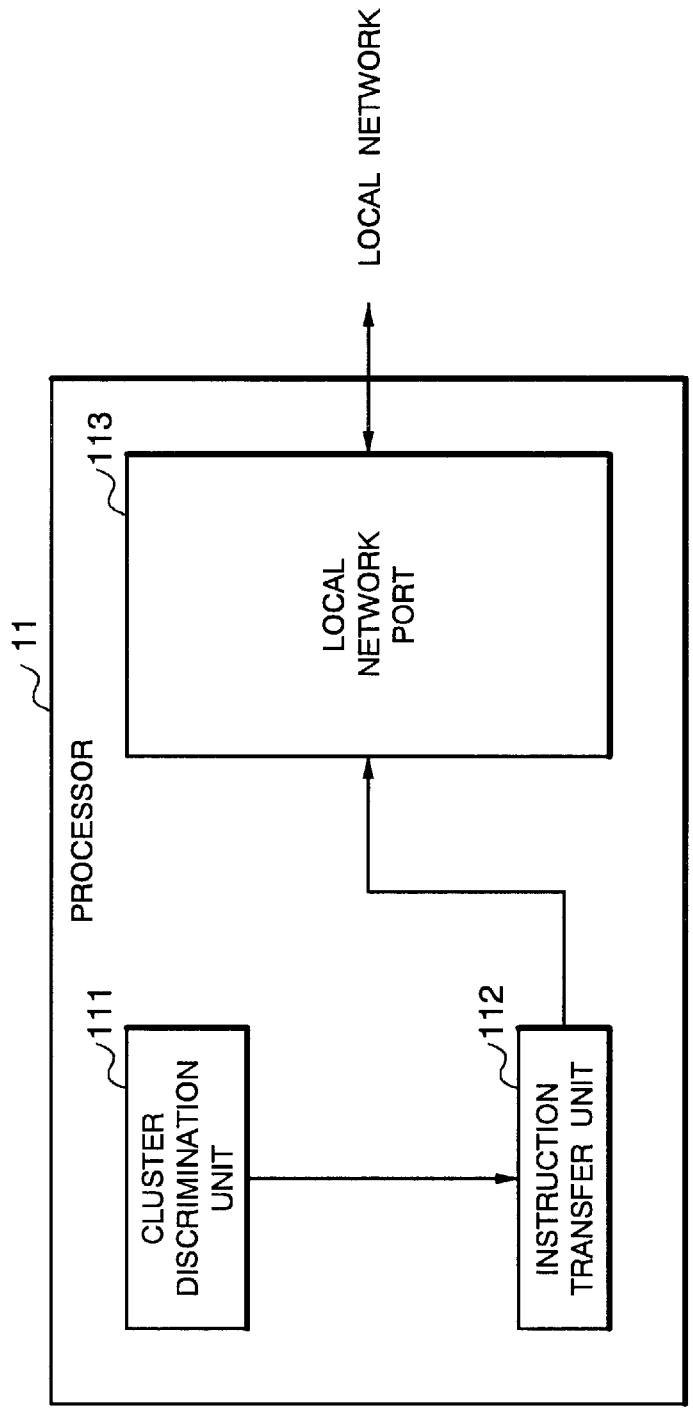
FIG. 2 is a block diagram showing an organization of a processor mounted on each of clusters forming the information processing system according to the first embodiment.

The processor 11 issues an instruction to the same cluster 10 (hereinafter, referred to as the present cluster) having this processor 11 and also issues an instruction to another cluster 10, conducting various controls. Further, the processor 11 comprises a cluster discrimination unit 111 and an instruction transfer unit 112 which are employed in case of issuing a control instruction for controlling an input/output device 14 of another cluster 10, as indicated in FIG. 2. FIG. 2 shows only characteristic portion of an organization in this embodiment, while other portions thereof are not shown there.

The cluster discrimination unit 111 makes a judgment whether an input/output instruction issued from the processor 11 of the present cluster is directed to the input/output device 14 of the present cluster, or it is directed to an input/output device 14 of another cluster 10.

When the input/output instruction is directed to the input/output device 14 of another cluster 10, the instruction transfer unit 112 executed transfer control so as to transfer the input/output instruction to another cluster 10 in which the input/output device 14 is mounted.

A local network port 113 controls an interface between the processor 11 and the local network 12.

The input/output device 14 is a device for executing input/output of various data. It is realized by output devices such as a printer, a display or the like, and by input devices such as a keyboard, a scanner or the like. Every cluster 10 has a proper input/output device 14. The device 14 may be selectively arranged; how many input/output devices are to be mounted, what type of input/output device is to be mounted on which cluster, or the like.

Figure 1:
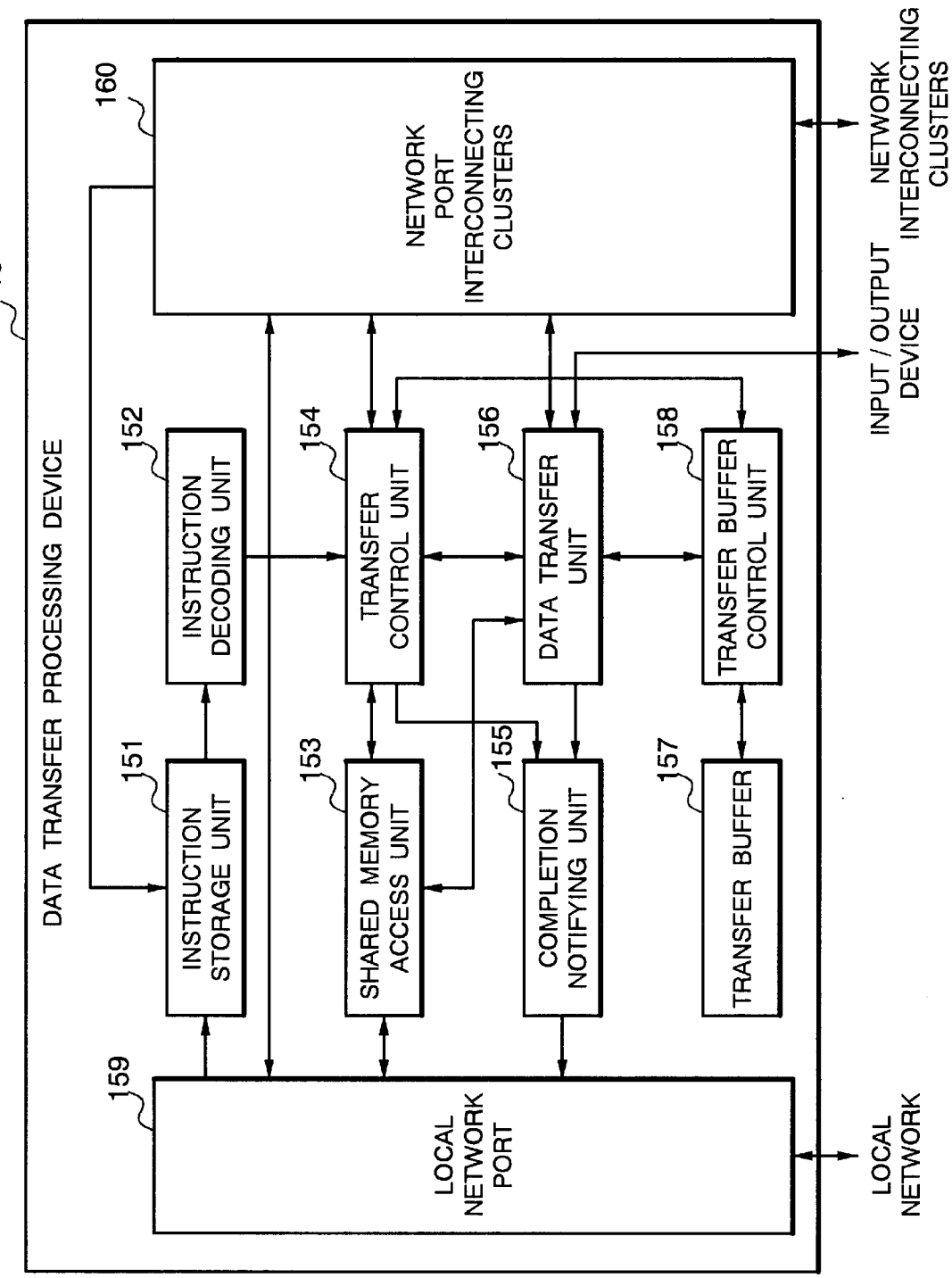
FIG. 1 is a block diagram showing an organization of a data transfer device mounted on each of clusters forming an information processing system according to a first embodiment of the present invention.

As illustrated in FIG. 1, the data transfer processing device 15 comprises an instruction storage unit 151 for receiving and storing issued instructions, an instruction decoding unit 152 for reading out an instruction from the instruction storage unit 151 and decoding it, a shared memory access unit 153 for reading and writing the data through access to the shared memory 13 of the present cluster 10, a data transfer unit 156 for executing data transfer between the network 40 interconnecting clusters and the input/output device 14, a transfer buffer 157 for temporarily storing the data to be transferred to another cluster 10, a transfer buffer control unit 158 for controlling reading and writing of the data from and into the transfer buffer 157, a shared memory access unit 153, a transfer control unit 154 for controlling the data transfer unit 156 and the transfer buffer control unit 158, and a completion notifying unit 155 for detecting and notifying completion of the transfer. FIG. 1 shows only a characteristic portion of the organization of the present embodiment, while the other portions thereof are not illustrated there.

The instruction storage unit 151 is realized by a memory, for example, a RAM or the like, and it stores the instructions issued by the processor 11. It doesn't matter whether the instructions to be stored in the instruction storage unit 151 may be issued by the processor 11 mounted on the present cluster 10, or delivered from another cluster 10. Instructions issued by the processor 11 of the present cluster 10 are supplied from the local network port 150 to the instruction storage unit 151 via the local network 12, while instructions issued by the processor 11 of another cluster 10 are supplied there from the network port 160 interconnecting clusters via the network 40 interconnecting clusters.

The instruction decoding unit 152 is realized by, for example, a CPU controlled by a program. The unit 152 reads out the transfer instruction stored in the instruction storage unit 151 and decodes the content thereof, thereby specifying the content of the instruction, and the cluster 10 and processor 11 having issued the instruction.

The shared memory access unit 153 is realized by, for example, a CPU controlled by a program. According to the instruction of the transfer control unit 154, the unit 153 reads out a desired data from the shared memory 13, sends it to the data transfer unit 156, and notifies the transfer control unit 154 of the data being acquired, or writes the data received from the data transfer unit 156 into the shared memory 13, similarly to the shared memory access unit in the conventional data transfer processing device.

The transfer control unit 154 is realized by, for example, a CPU controlled by a program. The unit 154 controls the shared memory access unit 153, the data transfer unit 156 and the transfer buffer control unit 158 according to the instruction decoded by the instruction decoding unit 152.

The completion notifying unit 155 issues the notice informing the completion of the processing at the completion of the execution of various processing by the control of the transfer control unit 154. The completion notice is transferred to the processor 11 having issued the instruction directing the corresponding processing.

The data transfer unit 156 is realized by, for example, a CPU controlled by a program. According to the instruction of the transfer control 154, the unit 156 transmits the data received from the shared memory access unit 153 to the network 40 interconnecting clusters, or delivers the data received via the network 40 interconnecting clusters to the shared memory access unit 153 so as to notify the transfer control unit 154 of the data being received, similarly to the data transfer unit of the conventional data transfer processing device.

The transfer buffer 157 is realized by a memory, for example, a RAM or the like. The unit 157 stores input/output data in the case of data input by the use of the input/output device 14 according to the input/output instruction issued from another cluster 10.

The transfer buffer control unit 158 is realized by, for example, a CPU controlled by a program. The unit 158 reads and writes data from and into the transfer buffer 157 according to the control of the transfer control unit 154.

The local network port 159 controls an interface between the data transfer processing device 15 and the local network 12. The network port 160 interconnecting clusters controls an interface between the data transfer processing device 15 and the network 40 interconnecting clusters.

Next, an operation of the information processing system of the first embodiment as constituted above, will be explained in the case of controlling an input/output device 14 belonging to a cluster 10 other than the present cluster 10 by the processor 11 mounted on the present cluster 10. Hereinafter, a cluster which issues input/output instructions is referred to as a cluster 10A, while a cluster which performs processing by the input/output device thereof is referred to as a cluster 10B in the following description. Characters A and B are attached to the reference numerals of the respective components of the clusters 10A and 10B for the purpose of discriminating between the components of the clusters 10A and 10B. In the example of the following operation, an input/output instruction issued from the cluster 10A is to direct the input/output device 14B of the cluster 10B to enter a predetermined data.

At first, the processor 11A of the cluster 10A issues an input/output instruction for controlling the input/output device 14B of the cluster 10B. At this time, the cluster discrimination unit 111A of the processor 11A judges whether the input/output instruction is directed to the input/output device of the present cluster or that of another cluster, on the basis of the cluster identifier specifying an objective cluster described in the input/output instruction. In this case, the input/output instruction toward the input/output device 14B of the cluster 10B is issued, so that the cluster discrimination unit 111A recognizes that the instruction is directed to the input/output device of another cluster.

The instruction transfer unit 112A of the processor 11A transfers the input/output instruction to the cluster 10B as the destination on the basis of the discrimination result by the cluster discrimination unit 111A. The input/output instruction is transferred to the data transfer processing device 15B of the cluster 10B, via the local network 12A, the data transfer processing device 15A and the network 40 interconnecting clusters of the cluster 10A.

In the cluster 10B, the data transfer processing device 15B stores the received instruction into the instruction storage unit 151B. The instruction decoding unit 152B reads out the instruction stored in the instruction storage unit 151B, decodes it and gives an instruction of necessary processing to the transfer control unit 154B. In this case, since the instruction is to direct the input/output device 14B to enter the predetermined data, the instruction decoding unit 152B sends the control information such as a device number (identifier data) of the input/output device 14B executing the processing, an address of the input data, a data length and the like, to the transfer control unit 154B, and gives an instruction to the transfer control unit 154B so as to receive the data by the specified input/output device 14B, write the input data into the transfer buffer 157B and transfer the data stored into the transfer buffer 157B to the cluster 10A.

The transfer control unit 154B, on receipt of the instruction from the instruction decoding unit 152B, gives an instruction to the data transfer unit 156B so as to read out the data entered by the specified input/output device 14B in units of a predetermined data length for data transfer (transfer units), and to transfer the read out data in units of every transfer to the transfer buffer control unit 158B. Further, it gives an instruction to the transfer buffer control unit 158B so as to write the data delivered from the data transfer unit 156B in units of every transfer into the transfer buffer 157B.

According to the instruction of the transfer control 154B, the data transfer unit 156B reads out the data in units of every transfer from the specified input/output device 14B and sends the read out data in units of every transfer to the transfer buffer control unit 158B. After having read the whole data, the data transfer unit 156B notifies the transfer control unit 154B of the reading completion.

The transfer buffer control unit 158B writes the data received from the data transfer unit 156B into the transfer buffer 157B according to the instruction of the transfer control unit 154B. After having written the whole data, the transfer buffer control unit 158B notifies the transfer control unit 154B of the writing completion.

The transfer control unit 154B, on receipt of the notice of the writing completion from the transfer buffer control unit 158B, gives an instruction to the transfer buffer control unit 158B so as to read out the data from the transfer buffer 157B and transfer the read out data to the data transfer unit 156B. The unit 154B gives an instruction to the data transfer unit 156B so as to transfer the data which has been transmitted from the transfer buffer control unit 158B, to the cluster 10A, to which data an operational instruction toward the transfer control unit 154A of the cluster 10A (a writing instruction of the transferred data into the shared memory 13A, a writing address, a data length of the transfer data and so on) and the cluster identifier of the destination cluster 10A are added.

The transfer buffer control unit 158B sends the data read out from the transfer buffer 157B to the data transfer unit 156B according to the instruction of the transfer control unit 154B.

The data transfer unit 156B first transmits the operational instruction toward the transfer control unit 154A of the cluster 10A, the cluster identifier of the destination cluster 10A and the like to the network 40 interconnecting clusters with the cluster 10A as the destination, and then, transmits the data received from the transfer buffer control unit 158B to the network 40 interconnecting clusters, also with the cluster 10A as the destination.

In the cluster 10A, the data transfer unit 156A of the data transfer processing device 15A separates the additional information such as the operational instruction and the like from the data received via the network 40 interconnecting clusters and sends it to the transfer control unit 154A.

The transfer control unit 154A gives an instruction to the data transfer unit 156A and the shared memory access unit 153A so as to write the data within the data transfer unit 156A into the shared memory 13A, on the basis of the received additional information.

The data transfer unit 156A sends the received data to the shared memory access unit 153A according to the instruction of the transfer control unit 154A.

The shared memory access unit 153A writes the received data sent from the data transfer unit 156A into the shared memory 13A and notifies the transfer control unit 154A of the writing completion.

The transfer control unit 154A, on receipt of the notice of the writing completion from the shared memory access unit 153A, sends the completion notice and the cluster number (identifier data) of the cluster 10B to the completion notifying unit 155A.

The completion notifying unit 155A notifies the cluster 10B of the data transfer being completed.

While, the transfer control unit 154B of the cluster 10B sends the cluster number (identifier data) of the cluster 10A and the processor number (identifier data) of the processor 11A having issued the input/output instruction to the completion notifying unit 155B, where the completion notice of the data transfer is executed.

The completion notifying unit 155B sends the cluster number of the cluster 10A and the processor number of the processor 11A having issued the input/output instruction, together with the completion notice to the cluster 10A through the data transfer unit 156B, according to the instruction of the transfer control unit 154B.

As mentioned above, since the information processing system of the present embodiment comprises a transfer buffer 157 for storing the data obtained by conducting the data input/output according to the instruction issued from another cluster 10 and a transfer buffer control unit 158 for controlling the transfer buffer 157, it is not necessary to use a shared memory 13 mounted on the same cluster 10 as the buffer for the data transfer when performing an input/output processing of the data. Therefore, the input/output processing can be directly executed according to the input/output instruction received from another cluster 10 without using the processor 11 mounted on the present cluster 10.

Next, a second embodiment of the present invention will be described hereinafter.

Figure 6:
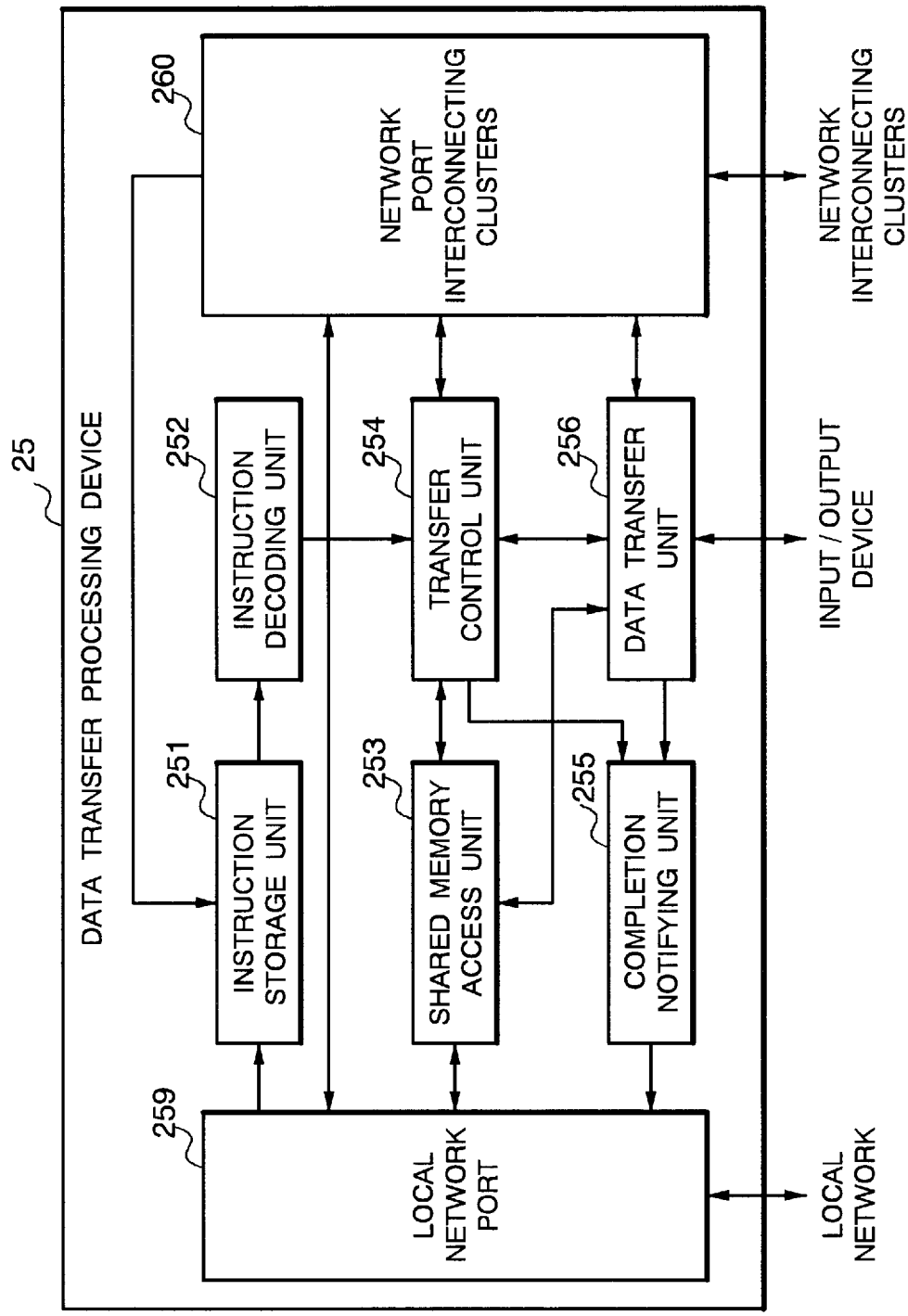
FIG. 6 is a block diagram showing an organization of a data transfer device mounted on each of clusters forming an information processing system according to a second embodiment of the present invention.
Figure 7:
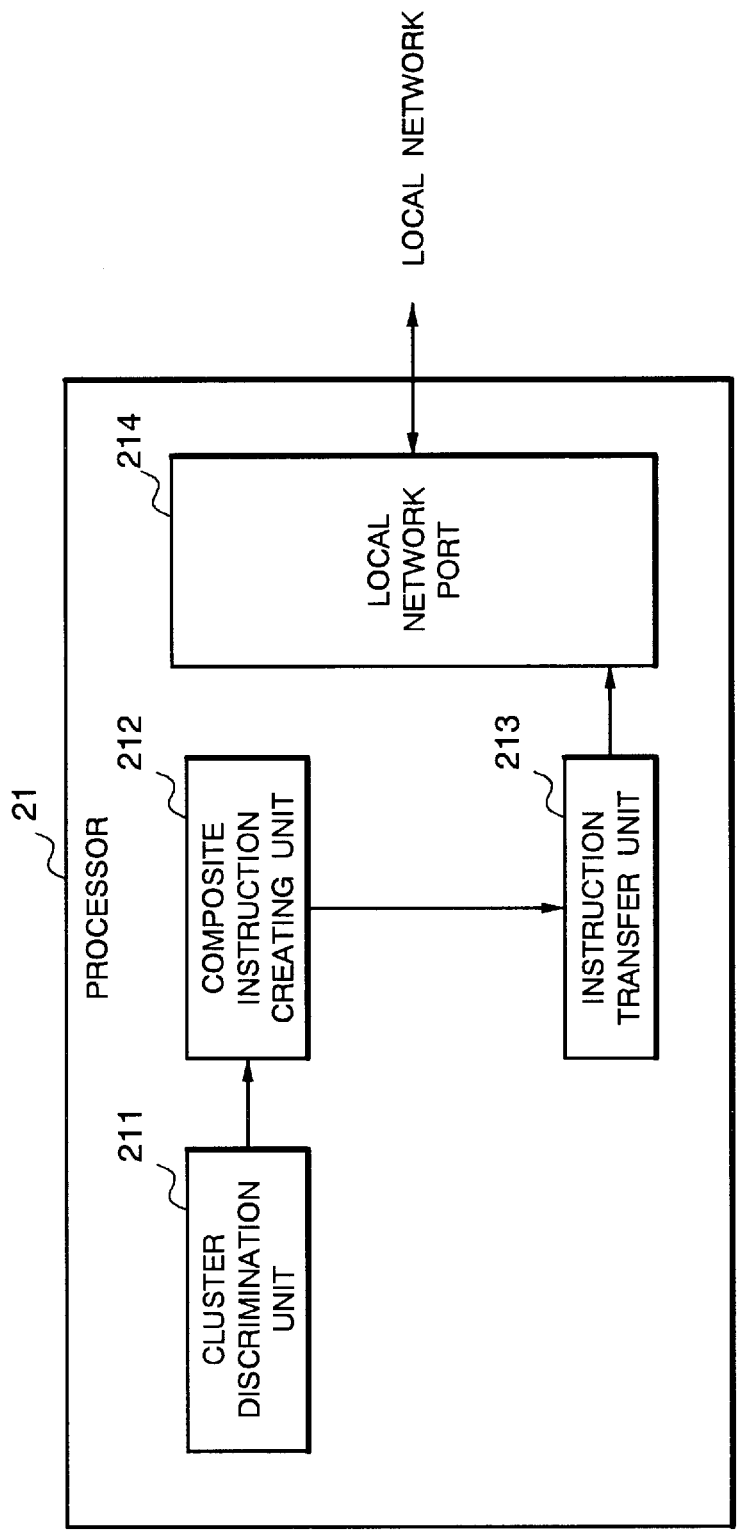
FIG. 7 is a block diagram showing an organization of a processor mounted on each of clusters forming the information processing system according to the second embodiment.
Figure 8:
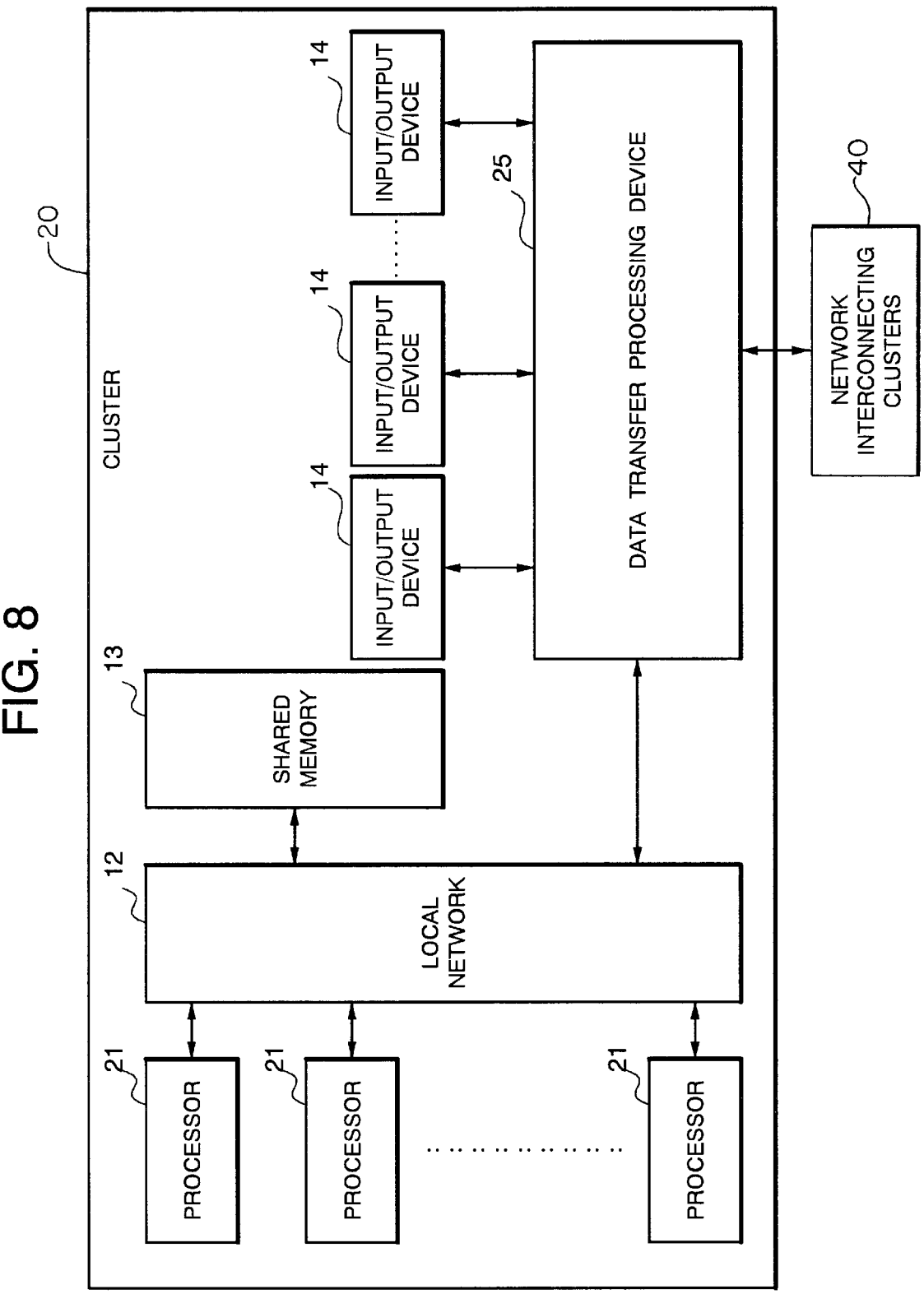
FIG. 8 is a block diagram showing an organization of the cluster according to the second embodiment.
Figure 9:
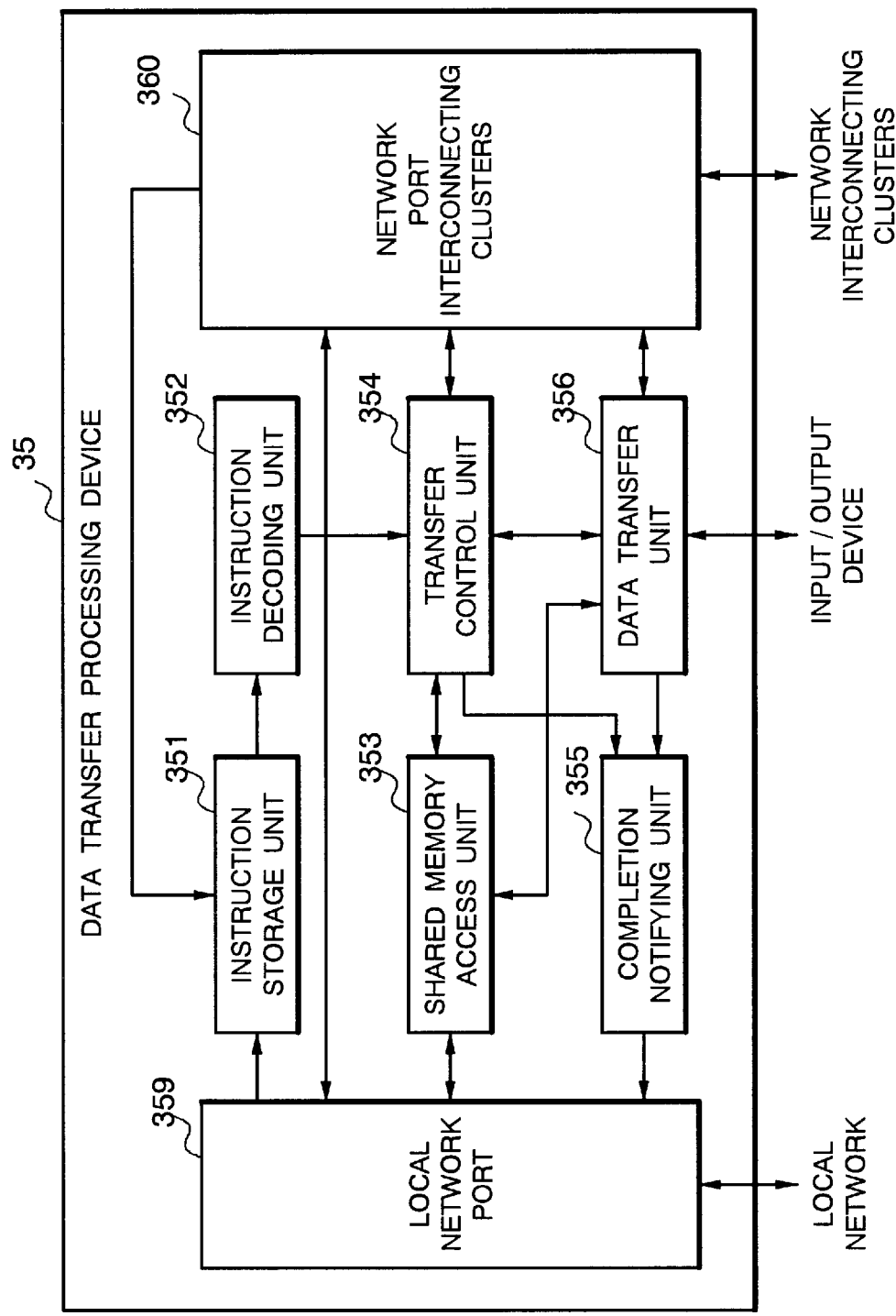
FIG. 9 is a block diagram showing an organization of a data transfer device mounted on each of clusters forming a conventional information processing system.
Figure 10:
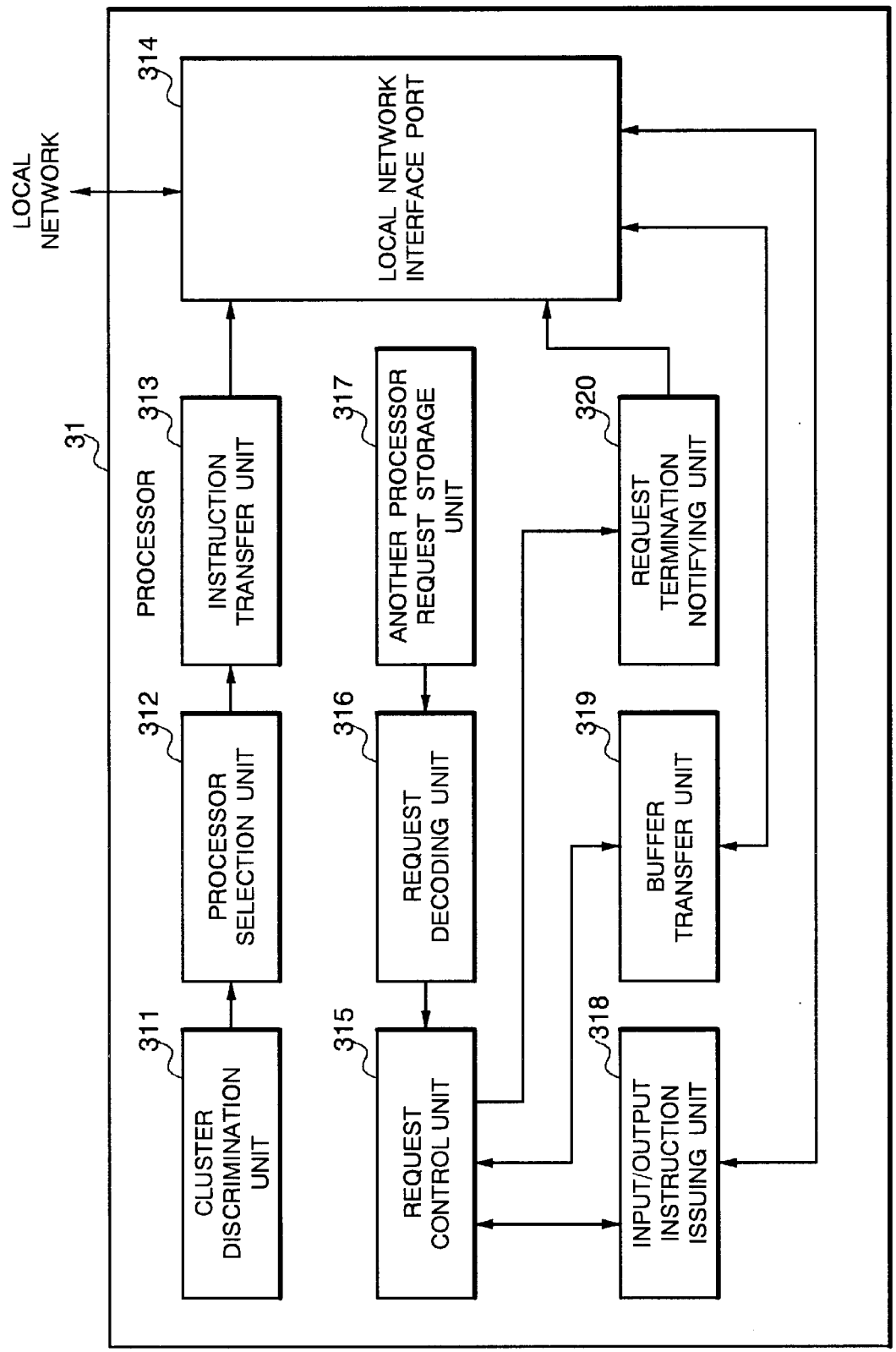
FIG. 10 is a block diagram showing an organization of a processor mounted on each of clusters forming the conventional information processing system.
Figure 11:
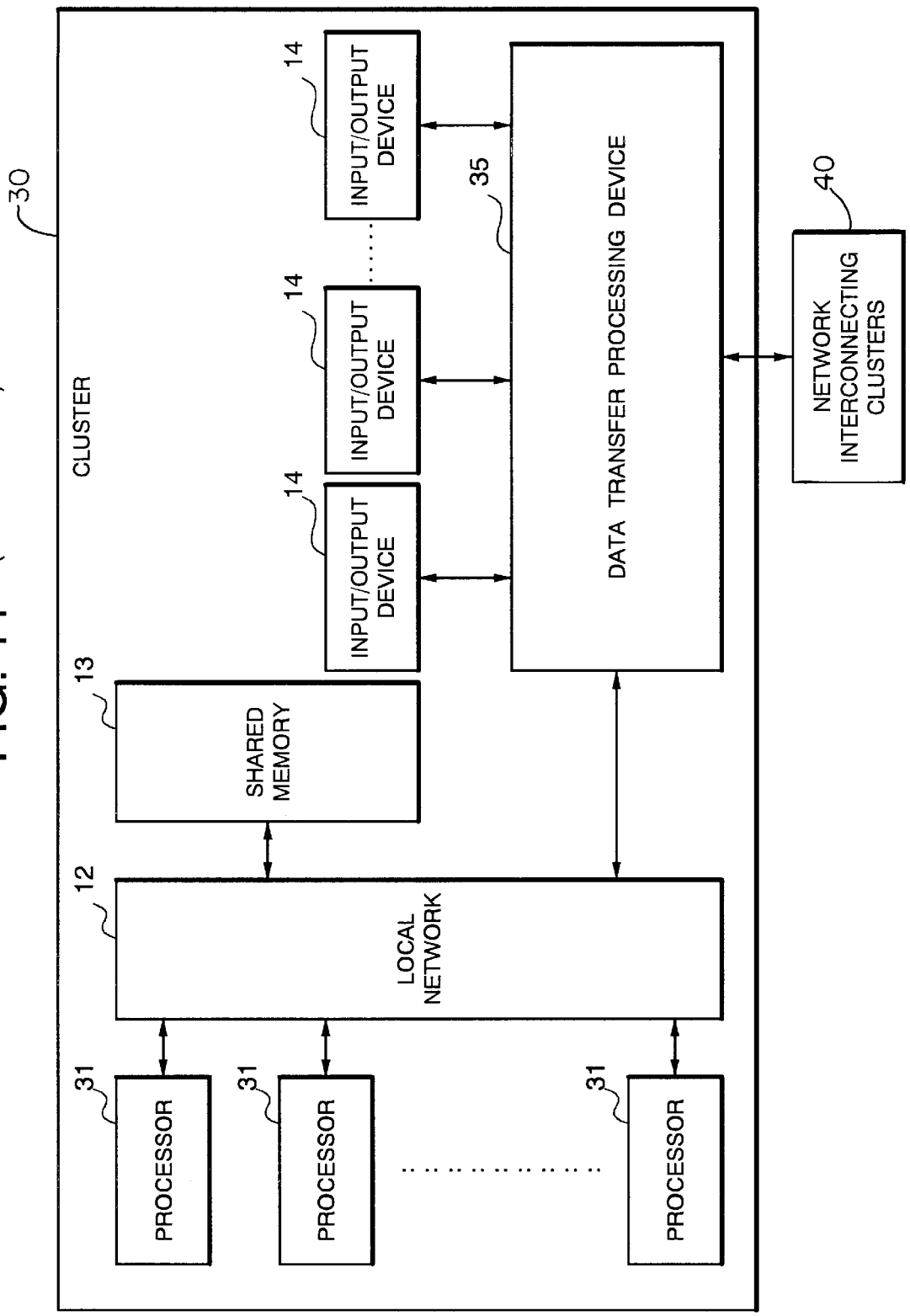
FIG. 11 is a block diagram showing an organization of the cluster of the conventional information processing system.

FIG. 8 is a block diagram showing an organization of a cluster 20 in an information processing system of the second embodiment. FIG. 7 is a block diagram showing an organization of a processor 21 mounted on each cluster 20 in the information processing system of the second embodiment. FIG. 6 is a block diagram showing an organization of a data transfer processing device 25 mounted on the cluster 20 in the information processing system of the embodiment.

As shown in the figures, the information processing system of the second embodiment is different from that of the first embodiment in respect of the organization of the processor 21 and the data transfer processing device 25 mounted on the cluster 20. A local network 12, a shared memory 13, an input/output device 14 and a network 40 interconnecting clusters which are other structural components of the cluster, have the same organization as the respective corresponding structural components, and accordingly, they are identified by the same reference numerals as the first embodiment and the description thereof will be omitted herein.

The processor 21 of the second embodiment issues instructions to the present cluster 20 and another cluster 20, and executes various controls. As shown in FIG. 7, the processor 21 comprises a cluster discrimination unit 211, a composite instruction creating unit 212 and an instruction transfer unit 213 which are used in case of issuing control instructions for controlling an input/output device 24 of another cluster 20. FIG. 7 shows only a characteristic portion of an organization of this embodiment, and other portions thereof are not illustrated therein.

The cluster discrimination unit 211 judges whether an input/output instruction issued from the processor 21 is directed to the input/output device 14 of the present cluster 20, or it is directed to the input/output device 14 of another cluster 20.

When the above input/output instruction is directed to the input/output device 14 of another cluster 20, the composite instruction creating unit 212 creates a transfer instruction for transferring the data acquired by the input/output instruction to the present cluster 20 and adds the transfer instruction to the input/output instruction.

When the above input/output instruction is directed to the input/output device 14 of another cluster 20, the instruction transfer unit 213 controls transfer of the input/output instruction and the transfer instruction created by the composite instruction creating unit 214 to another cluster including that input/output device 14.

A local network port 214 controls an interface between the processor 21 and the local network 12.

The data transfer processing device 25, as shown in FIG. 6, comprises an instruction storage unit 251 for receiving and storing issued instructions, an instruction decoding unit 252 for reading out the instructions from the instruction storage unit 251 and decoding the same, a shared memory access unit 253 for reading and writing the data through access to the shared memory 13 of the present cluster 20, a data transfer unit 256 for carrying out the data transfer between the network 40 interconnecting clusters and the data transfer processing device 25 and between the input/output device 14 and the device 25, a transfer control unit 254 for controlling the shared memory access unit 253 and the data transfer unit 256, and a completion notifying unit 255 for detecting and notifying completion of the transfer. It is noted here that FIG. 6 shows only a characteristic portion of the organization of the second embodiment, and other portions thereof are not illustrated therein.

The instruction storage unit 251 is realized by a memory such as a RAM or the like, and it stores the instructions issued by the processor 21. It doesn't matter whether the instructions to be stored in the unit 251 may be issued by the processor 21 mounted on the present cluster 20 or delivered from another cluster 20. The instructions issued by the processor 21 of the present cluster 20 are supplied from the local network port 259 to the instruction storage unit 251 through the local network 12. While, the instructions issued by the processor 21 of another cluster 20 are supplied from the network port 260 interconnecting clusters to the instruction storage unit 251 through the network 40 interconnecting clusters.

The instruction decoding unit 252 is realized by, for example, a CPU or the like controlled by a program. The instruction decoding unit 252 reads out the transfer instruction stored in the instruction storage unit 251 and decodes the content thereof, thereby specifying the content of the instruction, and the cluster 20 and processor 21 which have issued the instruction.

The shared memory access unit 253 is realized by a CPU or the like controlled by a program. According to the instruction of the transfer control unit 254, the shared memory access unit 253 reads out a desired data from the shared memory 13 so as to deliver it to the data transfer unit 256, and notifies the transfer control unit 254 of the data being acquired, or writes the data received from the data transfer unit 256 into the shared memory 13, similarly to the shared memory access unit of the conventional data transfer processing device.

The transfer control unit 254 is realized by a CPU or the like controlled by a program, and it controls the shared memory access unit 253, the data transfer unit 256 and a transfer buffer control unit 258 according to the instruction decoded by the instruction decoding unit 252.

The completion notifying unit 255 issues a notice informing completion of the processing at the completion of execution of various processing by the control of the transfer control unit 254. The completion notice is delivered to the processor 21 having issued the instruction directing the corresponding processing.

The data transfer unit 256 is realized by a CPU or the like controlled by a program. According to the instruction of the transfer control unit 254, the data transfer unit 256 supplies the data received from the shared memory access unit 253 to the network 40 interconnecting clusters or delivers the data received via the network 40 interconnecting clusters to the shared memory access unit 253 so as to notify the transfer control unit 254 of the data being received, similarly to the data transfer unit of the conventional data transfer processing device.

The local network port 259 controls an interface between the data transfer processing device 25 and the local network 12. On the other hand, the network port 260 interconnecting clusters controls an interface between the data transfer processing device 25 and the network 40 interconnecting network.

Figure 5:
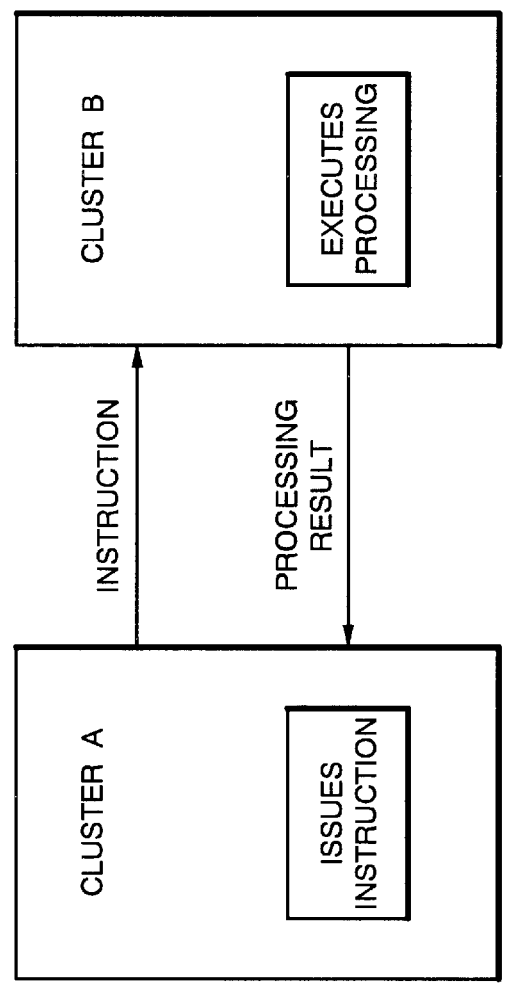
FIG. 5 is a schematic diagram showing relationship between a cluster which issues an instruction and a cluster which executes the instruction.

An operation of the information processing system of the second embodiment having the above-described constitution will be now explained in the case of controlling the input/output device 14 belonging to a cluster 20 other than the present cluster 20 by the processor 21 mounted on the present cluster 20. In the following description, as shown in FIG. 5, the cluster which issues an input/output instruction is referred to as a cluster 20A, while the cluster which performs the processing with the input/output device thereof is referred to as a cluster 20B. For the purpose of discriminating between components of the clusters 20A and 20B, characters A and B are attached to reference numerals of the respective components of the clusters 20A and 20B. In an example of the operation described below, the input/output instruction issued from the cluster 20A is to direct the input/output device 14B of the cluster 20B to enter a certain data.

In the cluster 20A, the processor 21A issues an input/output instruction for controlling the input/output device 14B of the cluster 20B. At this time, the cluster discrimination unit 211A of the processor 21A judges whether the input/output instruction is directed to the input/output device of the present cluster, or it is directed to the input/output device of another cluster, on the basis of the cluster identifier specifying an objective cluster described in the input/output instruction. In this case, because the input/output instruction directed to the input/output device 14B of the cluster 20B is issued, the cluster discrimination unit 211A recognizes that the input/output instruction is directed to the input/output device of another cluster.

On the basis of the discrimination result of the cluster discrimination unit 211A, the composite instruction creating unit 212A creates instructions for shifting the transferring parameter specified by the input/output instruction from the shared memory 23A of the cluster 20A to a buffer on the shared memory 23B of the cluster 20B, as well as instructions for transferring the data entered in the input/output device 14B of the cluster 20B to a buffer on the shared memory 23A of the cluster 20A after the data has been temporarily stored in the shared memory 23B, and adds these instructions to the input/output instruction. It is noted here that the transferring parameter means an instruction program for transferring to the cluster 20A the data delivered from the input/output device 14B of the cluster 20B in response to the input/output instruction.

The instruction transfer unit 212A transfers the composite instruction in which the input/output instruction and the instruction created by the composite instruction creating unit 212A are combined with each other, to the cluster 20B on the basis of the discrimination result of the cluster discrimination unit 211A. Consequently, the input/output instruction is supplied to the data transfer processing device 25A of the cluster 20B via the local network 12A, the data transfer processing unit 25A and the network 40 interconnecting clusters.

Then, in the cluster 20B, the data transfer processing device 25B stores the received instruction in the instruction storage unit 251B. The instruction decoding unit 252B reads out and decodes the instruction stored in the instruction storage unit 251B, and gives an instruction of necessary processing to the transfer control unit 253B. In this case, in order to shift the transferring parameter stored in the shared memory 13A of the cluster 20A to the shared memory 13B of the cluster 20B, the instruction decoding unit 252B gives an instruction to the transfer control unit 254B so as to read out the aimed transferring parameter from the shared memory 13A of the cluster 20A and write it in the shared memory 13B of the present cluster 20B.

According to the instruction, the transfer control unit 254B gives an instruction to the data transfer unit 256B so as to supply an operational instruction toward the transfer control unit 254A of the cluster 20A (such as a reading instruction from the shared memory 22, a reading starting address, a transfer length and so on) and the cluster identifier of the destination cluster 20B to the cluster 20A via the network 40 interconnecting clusters. The data transfer unit 256B supplies the operational instruction and the cluster identifier to the cluster 20A according to the instruction of the transfer control unit 254B.

Next, the transfer control unit 254A, on receipt of the operational instruction and the like by the data transfer processing device 25A of the cluster 20A, controls the shared memory access unit 253A so as to read out the transferring parameter from the shared memory 13, and transmits the transferring parameter to the cluster 20B. When the cluster 20B receives the transferring parameter, the transfer control unit 254B of the data transfer processing device 25B controls the shared memory access unit 253B so as to write the transferring parameter in the shared memory 13B.

In this way, the processing for shifting the transferring parameter for transferring the data entered from the input/output device 14B of the cluster 20B to the cluster 20A according to the input/output instruction from the cluster 20A, is completed.

Then, the instruction decoding unit 252B of the cluster 20B sends to the transfer control unit 254B the control information such as a device number (identification data) of the input/output device 14B which carries out the processing, an address of the input data, a length of the data, a reading starting address on the shared memory 13B and soon, depending on the result of decoding the instruction stored in the instruction storage unit 251B. The instruction decoding unit 252B gives an instruction to the transfer control unit 254B so as to enter the data from the input/output device 14B and write the entered data in the shared memory 13B.

According to the instruction, the transfer control unit 254B gives an instruction to the data transfer unit 256 so as to read out the data from the specified input/output device 14B and to deliver the read out data to the shared memory access unit 253B. The transfer control unit 254B also gives an instruction to the shared memory access unit 253B so as to write the data sent from the data transfer unit 256B in the shared memory 13B.

According to the instruction of the transfer control unit 254B, the data transfer unit 256B reads out the data from the specified input/output device 14B, delivers the read out data to the shared memory access unit 253B, and notifies the transfer control unit 154B of the reading completion. The shared memory access unit 253B writes the data received from the data transfer unit 256B in the shared memory 13B according to the instruction of the transfer control unit 254B, and notifies the transfer control unit 254B of the writing completion.

The data input processing by the input/output instructions from the cluster 20A is thus finished. Thereafter, the entered data is transferred to the cluster 20A through a processing similar to the normal data transfer processing between the shared memories of the clusters.

More specifically, first, in accordance with the transferring parameter stored in the shared memory 13, the instruction decoding unit 252B gives an instruction to the transfer control unit 254B so as to read out the entered data from the input buffer in the shared memory 13B to transfer the same to the shared memory 13A of the cluster 20A.

According to the instruction, the transfer control unit 254B receives information such as a reading starting address from the instruction decoding unit 252B, a data length of the transfer data and a writing starting address into the shared memory 13A of the cluster 20A, and gives an instruction to the shared memory access unit 253B so as to read out the data from the shared memory 13B in units of transfer for the data transfer processing.

The shared memory access unit 253B delivers the data read out from the shared memory 13B to the data transfer unit 256B and notifies the transfer control unit 254B of the reading completion.

The transfer control unit 254B, on receipt of the notice of the reading completion from the shared memory access unit 153B, gives an instruction to the data transfer unit 256B so as to send the data delivered from the shared memory access unit 253B to the network 40 interconnecting clusters. At this time, the cluster identifier of the cluster 20A, a writing address into the shared memory 13A of the cluster 20A, a data length of the transfer data and operational instructions to the data transfer processing device 25A of the cluster 20A are added to the transfer data.

The data transfer unit 256B transfers the transfer data which is entered in response to the input/output instruction from the cluster 20A and stored in the shared memory 13B to the cluster 20A via the network 40 interconnecting clusters, according to the instruction of the transfer control unit 254B.

Next, in the cluster 20A, the data transfer unit 256A of the data transfer processing device 25A separates the additional information such as the operational instructions from the data received via the network 40 interconnecting clusters and delivers it to the transfer control unit 254A.

The transfer control unit 254A gives an instruction to the data transfer unit 256A and the shared memory access unit 254A so as to write the data within the data transfer unit 254A into the shared memory 13A, on the basis of the additional information received.

The data transfer unit 256A delivers the received data to the shared memory access unit 253A according to the instruction of the data control unit 254A.

The shared memory access unit 253A writes the received data delivered from the data transfer unit 256A into the shared memory 13A, and notifies the transfer control unit 254A of the writing completion.

Meanwhile, when the transfer of all data stored in the transfer buffer 257 is finished, the transfer control unit 254B of the cluster 20B sends the cluster number (identification data) of the cluster 20A and the processor number (identification data) of the processor 21A which has issued the input/output instruction to the completion notifying unit 255B, where the completion notice of the data transfer is executed.

The completion notifying unit 255B transfers the cluster number of the cluster 20A, the processor number of the processor 21A which has issued the input/output instruction and the completion notice of the data transfer to the cluster 20A via the data transfer unit.

As described above, according to the information processing system of the second embodiment, the processor 21 is provided with the composite instruction creating unit 212 which creates the transfer instructions for returning the data acquired by executing the input/output instruction when the processor 21 issues the input/output instruction for controlling the input/output device 14 of another cluster 20, and which adds the transfer instruction to the input/output instruction, after the data is acquired by the cluster 20 having executed the input/output instruction, the data transfer processing is automatically performed between the clusters 20, so that the acquired data can be returned to the cluster having issued the input/output instruction. Accordingly, the input/output processing and the data transfer processing can be directly carried out in accordance with the input/output instruction received from another cluster 10 without using the processor 11 mounted on the present cluster 10.

As set forth so far, according to the information processing system of the present invention, it is possible to perform input/output of data by controlling an input/output device of another cluster from a predetermined cluster without requiring the input/output processing by the processor of another cluster.

Therefore, in the case where one of a plurality of clusters is regarded as a front end cluster and others are regarded as back end clusters and input/output devices of the respective clusters are concentrically controlled by the front end cluster, the load of the back end clusters can be reduced and the overall performance of the information processing system can be prevented from being deteriorated.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An information processing system including a plurality of clusters connected through a network interconnecting clusters, each of said clusters comprising a plurality of processors for performing various processing, a shared memory for being shared among the processors, a local network connecting the processors and the shared memory, and a data transfer processing device, which is connected with the local network, for controlling input/output devices and data transfer between another cluster and this one via the network interconnecting clusters, comprising:

a first cluster which issues a control instruction for controlling said input/output device of another cluster and a second cluster which executes processing by said input/output device according to the control instruction, wherein said processor mounted on said first cluster comprising:
a cluster discrimination means for discriminating a cluster which executes a control instruction when the control instruction is issued;
an instruction transfer means for transferring the control instruction to said corresponding second cluster according to the judgment of said cluster discrimination means;

said data transfer processing device mounted on said second cluster comprising:
a data transfer means for executing data transfer between said network interconnecting clusters and the input/output device;
a transfer data storage means for temporarily storing the data to be transferred to another cluster;
a transfer data reading and writing control means for controlling reading and writing of the data from and into said transfer data storage means;
a transfer control means for controlling said data transfer means, said transfer data reading and writing control means; and
a completion notifying means for detecting completion of the transfer and notifying the data destination of the transfer completion, wherein said transfer control means and said data transfer means execute the data input by means of the input/output device according to the control instruction issued from said first cluster, said transfer data reading and writing control means carries out reading and writing of the input data from and into said transfer data storage means according to the control of said transfer control means.

2. An information processing system including a plurality of clusters connected through a network interconnecting clusters, each of said clusters comprising a plurality of processors for performing various processing, a shared memory for being shared among the processors, a local network connecting the processors and the shared memory, and a data transfer processing device, which is connected with the local network, for controlling input/output devices and data transfer between another cluster and this one via the network interconnecting clusters, comprising:

a first cluster which issues a control instruction for controlling said input/output device of another cluster and a second cluster which executes processing by said input/output device according to the control instruction, wherein said processor mounted on said first cluster comprising:

a cluster discrimination means for discriminating a cluster which executes a control instruction when the control instruction is issued;
an instruction transfer means for transferring the control instruction to said corresponding second cluster according to the judgment of said cluster discrimination means;

said data transfer processing device mounted on said second cluster comprising:
a data transfer means for executing data transfer between said network interconnecting clusters and the input/output device;
a transfer data storage means for temporarily storing the data to be transferred to another cluster;
a transfer data reading and writing control means for controlling reading and writing of the data from and into said transfer data storage means;
a transfer control means for controlling said data transfer means and said transfer data reading and writing control means; and
a completion notifying means for detecting completion of the transfer and notifying the data destination of the transfer completion, wherein
said cluster discrimination means of said first cluster judges whether the control instruction issued by said processor is directed to an input/output device of the same cluster or whether it is directed to an input/output device of another cluster, and
said instruction transfer means of said first cluster performs transfer control for transferring the input/output instruction to said corresponding second cluster when the control instruction is an input/output instruction toward the input/output device of another cluster, and
when said transfer control means and said data transfer means execute the data input by means of the input/output device according to the control instruction issued from said first cluster, said transfer data reading and writing control means of said second cluster carries out reading and writing of the input data from and into said transfer data storage means according to the control of said transfer control means.

3. An information processing system including a plurality of clusters connected through a network interconnecting clusters, each of said clusters comprising a plurality of processors for performing various processing, a shared memory for being shared among the processors, a local network connecting the processors and shared memory, and a data transfer processing device, which is connected with the local network, for controlling input/output devices and data transfer between another cluster and this one via the network interconnecting clusters, comprising:

a first cluster which issues a control instruction for controlling said input/output device of another cluster and a second cluster which executes processing by said input/output device according to the control instruction, wherein said processor mounted on said first cluster comprising:
a cluster discrimination means for discriminating a cluster which executes a control instruction when the control instruction is issued;
a composite instruction creating means for creating a transfer instruction for transferring the processing result by the control instruction from said second cluster to said first cluster, so as to add the transfer instruction to the control instruction, depending on the judgment of said cluster discrimination means;
an instruction transfer means for transferring the control instruction to said corresponding second cluster according to the judgment of said cluster discrimination means;

said data transfer processing device mounted on said second cluster comprising:
a data transfer means for executing data transfer between said network interconnecting clusters and the input/output device;

a transfer control means for controlling said data transfer means, said transfer data reading and writing control means, and a completion notifying means for detecting completion of the transfer and notifying the data destination of the transfer completion.

4. An information processing system as set forth in claim 3, wherein said composite instruction creating means creates instructions for shifting the transferring parameter specified by the control instruction from the shared memory of said first cluster to a buffer on the shared memory of said corresponding second cluster as well as instructions for transferring the data entered by the input/output device of said second cluster to a buffer on the shared memory of said first cluster, so as to add these instructions to the control instruction.

5. An information processing system as set forth in claim 3, wherein all the clusters constituting said information processing system serve as both parts of said first cluster and said second cluster.

6. A cluster including a plurality of processors for performing various processing, a shared memory for being shared among the processors, a local network connecting the processors and the shared memory, and a data transfer processing device, which is connected with the local network, for controlling input/output devices and data transfer between another cluster and this one via a network interconnecting clusters, each cluster being connected to another cluster via the network interconnecting clusters, in which said processor comprising:

a cluster discrimination means for discriminating a cluster which executes the control instruction when the control instruction is issued;

an instruction transfer means for transferring the control instruction to another corresponding cluster according to the judgment of said cluster discrimination means; and said data transfer processing device comprising:

a data transfer means for executing data transfer between said network interconnecting clusters and the input/output device;

a transfer data storage means for temporarily storing the data to be transferred to another cluster;

a transfer data reading and writing control means for controlling reading and writing of the data from and into said transfer data storage means;

a transfer control means for controlling said data transfer means and said transfer data reading and writing control means; and a completion notifying means for detecting completion of the transfer and notifying the data destination of the transfer completion, wherein said cluster discrimination means discriminates whether the control instruction issued by said processor is directed toward an input/output device of the same cluster or whether it is directed to an input/output device of another cluster, and said instruction transfer means performs transfer control for transferring the input/output instruction to another cluster when the control instruction is an input/output instruction toward the input/output device of another cluster, and when said transfer control means and said data transfer means execute the data input by means of the input/output device according to the control instruction issued from another cluster, said transfer data reading and writing control means carries out reading and writing of the input data from and into said transfer data storage means according to the control of said transfer control means.

7. A cluster including a plurality of processors for performing various processing, a shared memory for being shared among the processors, a local network connecting the processors and the shared memory, and a data transfer processing device, which is connected with the local network, for controlling input/output devices and data transfer between another cluster and this one via a network interconnecting clusters, said cluster being connected to another cluster via the network interconnecting clusters, in which said processor comprising:

a cluster discrimination means for discriminating a cluster which executes the control instruction when the control instruction is issued;

a composite instruction creating means for creating a transfer instruction for transferring the processing result by the control instruction from said second cluster to said first cluster, so as to add the transfer instruction to the control instruction, depending on the judgment of said cluster discrimination means;

an instruction transfer means for transferring the control instruction to another corresponding cluster according to the judgment of said cluster discrimination means; and said data transfer processing device comprising:

a data transfer means for executing data transfer between said network interconnecting clusters and the input/output device;

a transfer data storage means for temporally storing the data to be transferred to another cluster;

a transfer data reading and writing control means for controlling reading and writing of the data from and into said transfer data storage means;

a transfer control means for controlling said data transfer means and said transfer data reading and writing control means; and a completion notifying means for detecting completion of the transfer and notifying the data destination of the transfer completion.

8. A cluster as set forth in claim 7, wherein said composite instruction creating means creates instructions for shifting the transferring parameter specified by the control instruction from the shared memory of the same cluster to a buffer on the shared memory of another cluster as well as instructions for transferring the data entered by the input/output device of another cluster to a buffer on the shared memory of the same cluster, so as to add these instructions to the control instruction, on the basis of the discrimination result of said cluster discrimination means.

9. An information processing system including a plurality of clusters connected through a network interconnecting clusters, each of said clusters comprising a plurality of processors for performing various processing, a shared memory for being shared among the processors, a local network connecting the processors and the shared memory, and a data transfer processing device, which is connected with the local network, for controlling input/output devices and data transfer between another cluster and this one via the network interconnecting clusters, comprising:

said clusters issue a control instruction for controlling said input/output device of another cluster and execute processing by said input/output device according to the control instruction, wherein said processor mounted on each cluster of a plurality of clusters comprising:
- a cluster discrimination means for discriminating a cluster which executes a control instruction when the control instruction is issued;
- an instruction transfer means for transferring the control instruction to said corresponding another cluster according to the judgment of said cluster discrimination means;

said data transfer processing device mounted on each cluster of a plurality of clusters comprising:
- a data transfer means for executing data transfer between said network interconnecting clusters and the input/output device;
- a transfer data storage means for temporarily storing the data to be transferred to another cluster;
- a transfer data reading and writing control means for controlling reading and writing of the data from and into said transfer data storage means;
- a transfer control means for controlling said data transfer means and said transfer data reading and writing control means; and
- a completion notifying means for detecting completion of the transfer and notifying the data destination of the transfer completion, wherein, when said transfer control means and said data transfer means execute the data input by means of the input/output device according to the control instruction, said transfer data reading and writing control means carries out reading and writing of the input data from and into said transfer data storage means according to the control of said transfer control means, whereby data transfer between said input/output device and said shared memory of a cluster and another cluster is executed by input/output processing in said processor of an arbitrary cluster.

10. An information processing system as set forth in claim 9, wherein said cluster discrimination means judges whether the control instruction issued by said processor is directed to an input/output device of the same cluster or whether it is directed to an input/output device of another cluster, and said instruction transfer means performs transfer control for transferring the input/output instruction to corresponding another cluster when the control instruction is an input/output instruction toward the input/output device of another cluster.

* * * * *